Aug. 30, 1966  A. B. GROSE  3,269,406
VALVE
Filed March 25, 1965  3 Sheets-Sheet 1
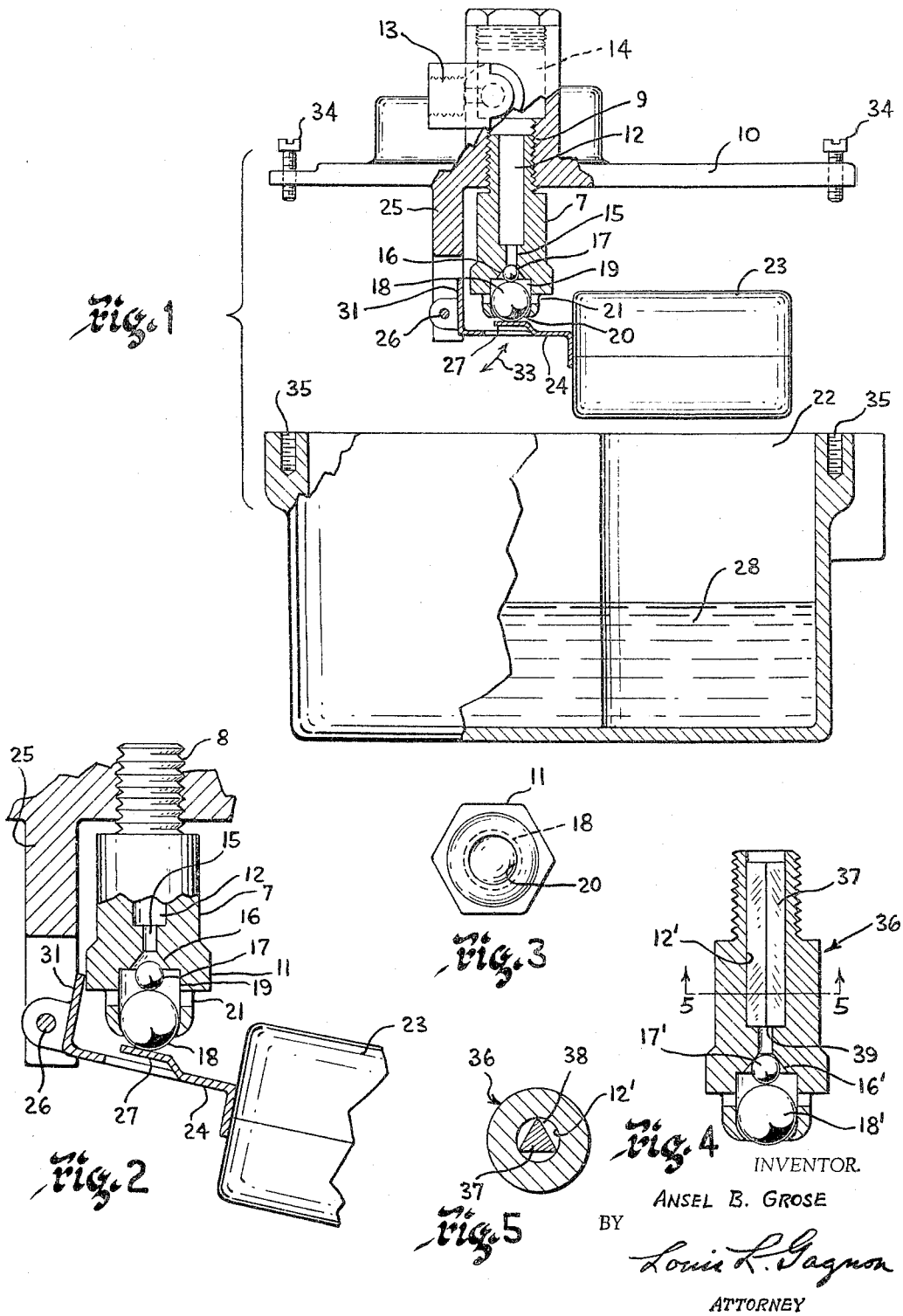
INVENTOR.
ANSEL B. GROSE
BY
Louis L. Gagnon
ATTORNEY Aug. 30, 1966  A. B. GROSE  3,269,406
VALVE
Filed March 25, 1965  3 Sheets-Sheet 2
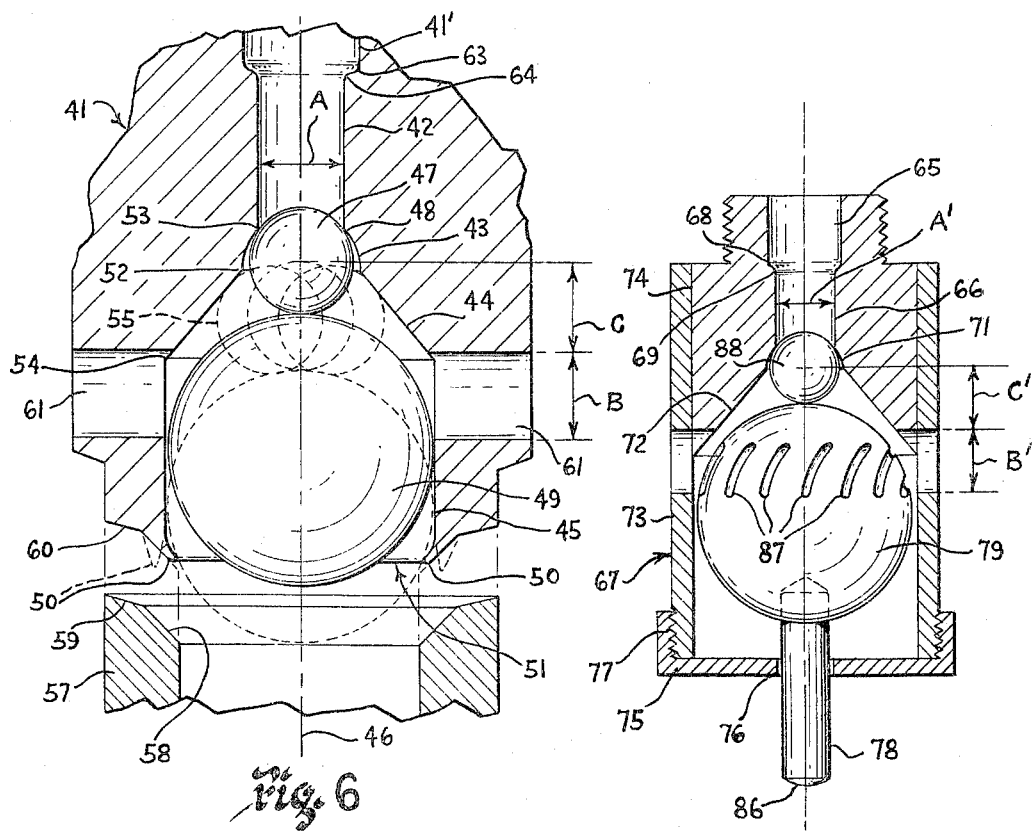
Fig. 6
Fig. 7
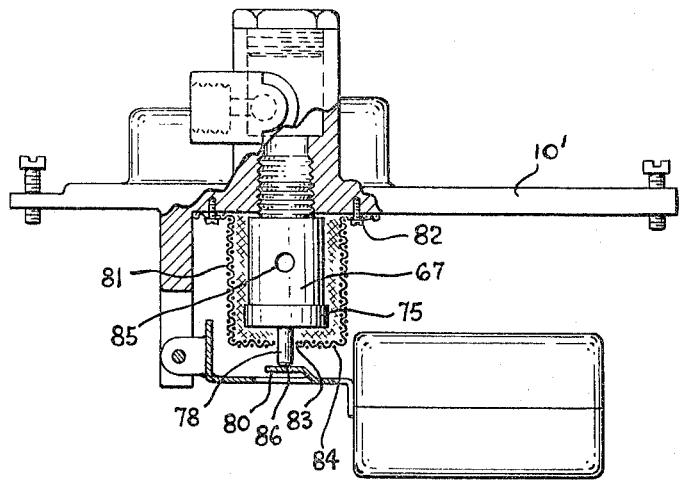
Fig. 8
INVENTOR.
ANSEL B. GROSE
BY
Louis L. Gagnon
ATTORNEY Aug. 30, 1966    A. B. GROSE    3,269,406
VALVE
Filed March 25, 1965    3 Sheets-Sheet 3
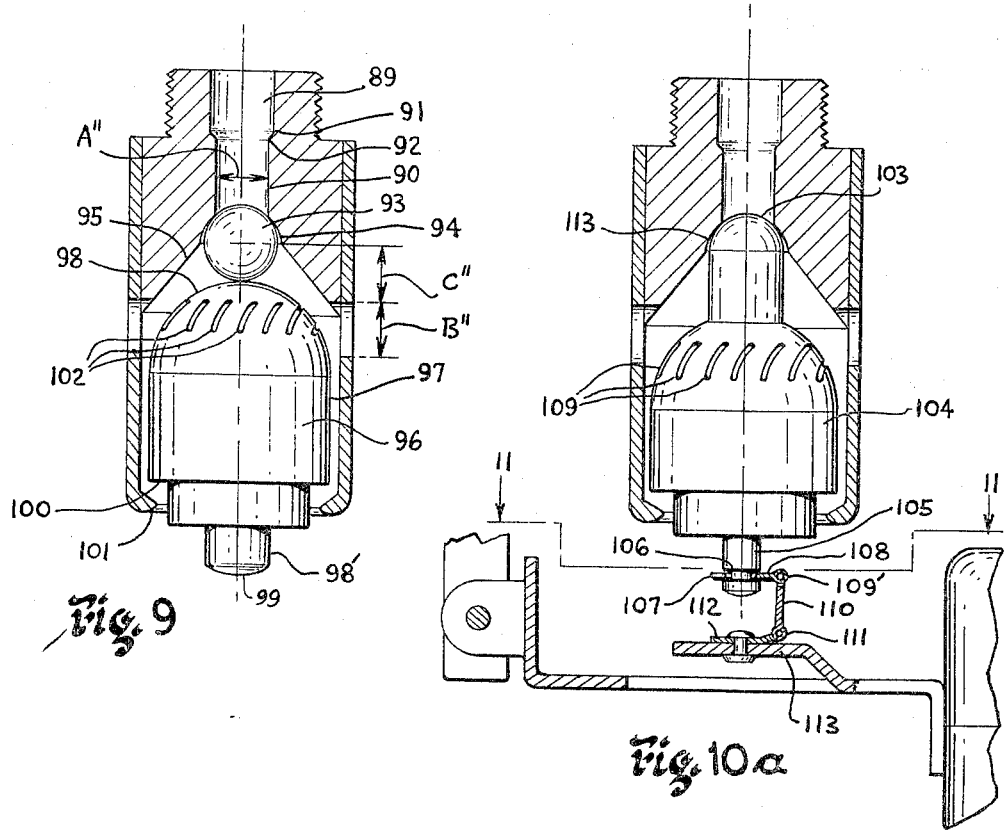
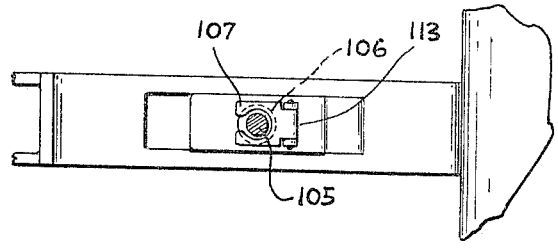
INVENTOR.
ANSEL B. GROSE
BY
Louis K. Gagnon
ATTORNEY

# United States Patent Office 3,269,406
Patented August 30, 1966

3,269,406
VALVE
Ansel B. Grose, 8 Mount Vernon St., Stoneham, Mass.
Filed Mar. 25, 1965, Ser. No. 442,747
6 Claims. (Cl. 137—436)

This application is a continuation-in-part of my application Serial No. 93,899, filed March 7, 1961, now abandoned, and further is a continuation in part of my co-pending application Serial No. 236,767, filed November 7, 1962, now issued as Patent No. 3,180,354.

This invention relates to an improved fuel control valve for use with carburetors for internal combustion engines.

Most carburetors presently used with internal combustion engines are coupled with high fuel input pressures which require a sensitive, positively functioning valve member for insuring the regulation of flow of the fuel between the fuel pump and the float chamber of present-day types of carburetors.

In most prior art devices a conventional needle valve assembly has been utilized to regulate the flow of the fuel. These assemblies in general included a main body provided with an elongated orifice extending therein, the orifice generally terminating in a transverse flat surface to provide a seat and the flow of the fuel through the orifice is wholly or partly interrupted by a conical shaped end portion of a valve plunger positioned in said orifice. As is conventional in carburetors the relative positioning of the conical shaped end portion with respect to the periphery of the orifice is controlled by a buoyant float member within the float chamber of the carburetor. As the buoyant float rises in response to the rise of the fuel fuel in the fuel chamber of the carburetor, it is adapted to engage the plunger to force the conical shaped end portion thereof into engagement with the edge of the orifice forming valve seat in the flat transverse surface.

Such conventional types of needle valve assemblies have caused serious difficulties in the past for, in most instances due to the metal contact between the conical shaped end portion and the relatively sharp periphery of the orifice in the valve seat a very rapid wearing of either the conical end or deformation of the seat itself took place. Thus, the high fuel pressure required in present-day high compression engines caused early failure of both the valves and the seats of such assemblies.

Additionally, the relatively large reduction which is required in the fuel level before the conical portion can properly disengage the seat caused an extreme reduction in engine efficiency at high speeds. At such speeds, when the demand for fuel is relatively high, the level of the fuel within the float chamber required a considerable drop in said level before the conical end portion could emerge far enough out of the orifice to permit sufficient fuel to enter the carburetor, this caused a "lean out" of fuel at high speeds and resulted in extremely inefficient engine performance.

Further, most conventional needle valve assemblies of this nature fail to hold high fuel pump pressures and even a slight particle of dirt or other foreign matter on the tapered end of the valve or seat would cause leakage and other difficulties.

Several different constructions of valves have been devised in the past with a view to overcoming the above difficulties. One of the most practical prior art valve constructions was that of replacing the needle valve with a valve member having a disk of resilient material such as rubber or the like which is adapted to engage an annular valve seat and which disk is so constructed as to have self-fitting characteristics with the annular seat. While overcoming most of the difficulties encountered with needle type valves, such self-adjusting resilient disks defined in the latter structure also failed in that they soon became inoperative either due to deterioration of the rubber disk or the deformation thereof due to repeated engagement and disengagement thereof with the annular seat, which engagement and disengagement was throughout the same engaging areas, with the result that said areas soon became deformed thereby permitting leakage and failure of proper response throughout long periods of use.

The primary object of the present invention, therefore, is directed to overcoming the difficulties encountered with the above-mentioned types of valves through the provision of a valve arrangement wherein the moving valve part will have a constantly changing area of contact with the valve seat and which will be extremely sensitive and positive in its action throughout a greatly prolonged period of use as compared with known prior art valves of this nature.

Another object is to provide a valve of the character described wherein all of the working parts thereof are carefully controlled as to their related dimensions in order to produce maximum efficiency under all conditions of use.

A further object of the invention is to provide a valve assembly which eliminates flooding by providing a positive cutoff in the input fuel supply; which will positively operate in response to extremely small variations in fuel level within the carburetor; that will be extremely resistant to wear and deformation of the mating parts and which will be positive in its function either when the motor is idling or operating at varying speeds.

Another object is to provide a novel valve arrangement for carburetors or the like which has a ball shaped face part which, as compared with known existing ball valves in general, is so constructed and dimensionally controlled with respect to its related parts that, during its operation, it will positively seat regardless of the line of force imparted thereon by the rise of the float in the fuel chamber; which will have a floating spinning action when disengaged from the valve seat and thereby cause a spraying action of the fuel passing therearound when being forced under pressure from the fuel pump and which spinning has a self-cleansing action for the removal of any foreign matter which might become lodged on said ball or valve seat.

Another object is to provide a novel ball valve arrangement of the above character wherein an intermediate ball is provided for forcing said first ball valve member into engagement with the valve seat in response to pressure on said intermediate ball by the rise of the float in the fuel chamber whereby a more positive free sealing action of the first ball valve member with said valve seat will be insured and whereby the valve parts and housing therefor may be initially assembled as a unit and with the first ball valve member being carefully located in proper operative cooperation with the valve seat and thereafter retained in said relation.

Another object is to provide a ball valve arrangement of the above character having a magnet located internally of the valve housing in spaced cooperative relation with the ball valve and which is adapted to more positively insure proper alignment and seating of the ball valve with its valve seat.

Another object is to control the related size of the restricted passageway through which the liquid fuel initially flows into the valve, the sizes of the openings in the side walls of the valve and the location of said openings with respect to the horizontal center line of the small ball faced part or small ball valve when in engagement with its valve seat as to insure greater efficiency of the flow of liquid fuel through said valve when in use.

Another object is to provide a liquid flow control valve member for use with devices embodying a liquid reservoir, a liquid line for feeding liquid under pressure into said reservoir and a float having engagement means for engaging and operating said liquid flow control valve member, said valve member comprising a main body portion of rigid material having a restricted liquid passageway and an enlarged passageway therein, said enlarged passageway terminating internally in an annular concave curvature of a radius of from approximately $\frac{1}{16}$ to $\frac{1}{8}$ of an inch blending into an annular convex curvature of a radius of from approximately $\frac{1}{16}$ to $\frac{1}{8}$ of an inch whose inner edge is of substantially the same diameter as the adjacent end of the restricted passageway and blends into said end.

Another object is to provide the backing ball or actuating means with a reduced portion extending outwardly of the open end of the body portion by an amount sufficient to enable the engagement means of the float to engage said portion in instances when backing ball or actuating means cannot be directly engaged.

Other objects and advantages of the invention will become apparent by referring to the following description taken in connection with the accompanying drawings in which:

FIG. 1 illustrates one of the preferred embodiments of the invention installed in a conventional carburetor, wherein only the significant parts of the carburetor are shown in exploded relation with each other and wherein certain of the parts are shown in cross-section.

FIG. 2 is an enlarged fragmentary partially sectioned view of the valve construction illustrated in FIG. 1 showing it in open position and in associated relation with the float and its supporting parts;

FIG. 3 is a bottom plan view of the valve assembly;

FIG. 4 is an enlarged view of a modified form of the invention;

FIG. 5 is a sectional view taken as on line 5—5 of FIG. 4 looking in the direction of the arrows;

FIG. 6 is an enlarged fragmentary sectional view of a modified form of the invention;

FIG. 7 is a view similar to FIG. 5 of another modification;

FIG. 8 is a view similar to the upper portion of FIG. 1 and showing a further modification of the invention with the valve member of FIG. 7 shown in full lines;

FIGS. 9 and 10a show further modifications of the invention; and

FIG. 11a is a fragmentary view taken as along line 11—11 of FIG. 10a and looking in the direction of the arrows.

Referring more particularly to the drawings wherein like characters of reference designate like parts throughout the various views, one of the devices embodying the invention as shown in FIGS. 1, 2 and 3 comprises a main body portion 7 having a threaded end portion 8 by means of which the said body portion may be threadedly attached as at 9 to the fuel chamber cover plate 10 of a conventional type carburetor. Exteriorly of the main body portion there is provided an hex-portion 11 whereby the said body portion may be threaded into or out of the threaded opening 9 in the cover plate by the use of a wrench instead of a conventional slot and screwdriver arrangement. Internally of the main body portion 7 there is a fuel orifice 12 communicating with the main fuel coupling 13 by means of which a main fuel line from a conventional fuel pump, not shown, is connected with the carburetor. The fuel entering the coupling 13 is fed into a chamber 14 and from said chamber through the fuel orifice 12. The fuel orifice communicates with a restricted passageway 15 having at its lower end a hollow tapered section 16 which is of an acute angle of approximately 41° and which communicates with an annular valve seat 16 in said tapered section on the side thereof toward the adjacent end of the passageway.

The small ball valve 17 which will hereinafter be referred to as a ball valve is positioned within the hollow tapered section and is held therein by a backing ball functioning as actuating means 18 located within an enlarged cylindrically shaped recessed area 19 having straight substantially parallel side walls internally of the lower end of the main body portion 7 and which communicates with said hollow tapered section. The ball 18 is loosely held in the recessed area by displacing the lower edge of the open end of the main body portion slightly inwardly as illustrated at 20. The extent of displacement being so controlled that about $\frac{1}{4}$ of the diameter of the ball 18 is allowed to protrude outwardly of said inwardly displaced edge. With the hereinafter given fuel line pressure and horsepower of engine, the ball valve 17 is preferably of a diameter of approximately $\frac{7}{64}$ or .1093 of an inch and the passageway 15 is preferably $\frac{9}{10}$ or .098 of the diameter of the ball valve 17 or approximately $\frac{1}{10}$ less than the diameter of ball valve 17.

The backing ball 18 functioning as actuating means is preferably of a diameter of approximately $\frac{9}{32}$ of an inch or of a diameter of approximately 2½ times that of the ball valve 17 and the recessed area 19 in which it is positioned is of a diameter of from approximately .005 to .007 of an inch greater than the diameter of said ball 18. The related diameter of the ball valve 17 is designed so as not to expose too much of the area of the ball valve to the fuel pressure thereby insuring a positive seal of the ball valve with the valve seat and with no leakage at any time when the ball valve is moved to closed position.

In the present instance the valve is designed for use with a fuel pump pressure of from 4 to 6 lbs. per square inch and is designed for use with engines of approximately 150 horsepower. However, it is to be understood that with the engines of greater horsepower the related proportions of the passageway 15, ball valve 17, and backing ball will be proportionately varied or increased in accordance with the change or increase of horsepower and the change or increase in fuel pump pressure. While the ball valve 17, with the above-described arrangement, is stated as being preferably approximately $\frac{7}{64}$ of an inch in diameter it could be varied from $\frac{1}{16}$ to $\frac{7}{32}$ of an inch in diameter keeping in mind, of course, that the related dimension of the passageway 15 and valve seat would be varied to retain the above-mentioned dimensional characteristics. The backing ball 18 would, of course, also be varied in related proportion. This is to adapt the valve for use with engines of different horsepowers and for use with different fuel line pressures.

The recessed area 19 is provided with transverse openings 21 whose axes are above the center of the ball 18 whereby the fuel being forced through the orifice 12 and passageway 15, when the ball valve 17 is disengaged from the valve seat 16, will be permitted to flow about the ball 17 outwardly of the openings 21 into the fuel chamber 22. A float 23 connected by an arm 24 to a support 25 through a pivotal connection 26 is adapted to be positioned internally of the fuel chamber when the cover 19 is in assembled secured relation with said chamber. The arm 24 is provided with an adjustable contact 27 which is adapted to engage the ball 18 when the fuel 28 in the fuel chamber rises and in turn causes the float 23 to rise. When the fuel 28 reaches a desired level, the rise of the float 23 will be such as to cause the intermediate ball 18 to engage the ball valve 17 and in turn force it into intimate contact with the seat 16 and thereby shut off the flow of fuel into the fuel tank 22.

As diagrammatically shown in FIG. 2, when the level of the fuel 28 lowers in response to its consumption during the operation of the engine, the float 23 will, in turn, fall in the direction indicated by the arrow 33 thereby relieving pressure on the intermediate ball or actuating means 18 which, in turn, allows the ball valve 17 to be forced out of engagement with the valve seat 16 by the pressure in the fuel line or by the action of gravity to again permit the fuel to flow through said valve into the fuel tank. This movement of the float 23 in response to the change of fuel level is extremely critical being only of the magnitude of a few fractions of an inch whereby the fuel is substantially immediately replaced in proportion to its consumption during the operation of the engine regardless of the speed of operation thereof.

With the present arrangement the parts are so assembled as to permit the ball valve 17 and backing ball 18 to rise and fall about 1/16 to 3/32 of an inch in response to the movement of the float. A drop of the ball valve 17 of about .020 of an inch out of engagement with the valve seat is equal to full opening of the orifice 15 causing maximum flow of fuel. This is equal to approximately 1/8 of an inch float drop. The related dimensions of the passageway 15, ball valve 17, and the angle of the seat 16, are so controlled that the force of the fuel under the above-mentioned pressure has a tendency to cause the ball valve 17 to spin with a sort of floating action rather than to be completely dislodged from the valve seat thereby causing the fuel to be dispensed with more of a spraying action rather than a squirting action such as takes place with a needle type valve. This spinning action not only produces a self-cleaning action for removing any foreign matter which might become lodged on the ball or valve seat but further causes different areas of the ball to be presented to the valve seat when again forced thereagainst by the pressure exerted on the ball 18 when the float 23 rises. By this it is meant that the area of the ball 17 is so shifted due to said spinning action that it never re-engages with the seat 16 with the same area of contact thereby greatly prolonging the life and durability of the valve.

The level of the fuel in the fuel tank in response to the opening and closing of the ball valve 17 may be varied by adjustment of the adjustable contact member 27 on the lever 24. The related dimensions of the orifice 15, size of ball valve 17 and the angle of the seat 16 are further controlled in accordance with the length of the lever and pressure on said ball valve resulting therefrom. The length of lever is the distance between the pivot 26 and the point of engagement of the contact 27 with the ball 18. In the present instance, this distance is from 3/8 to 1/2 of an inch.

The float in all instances is prevented from lowering more than a controlled amount by an adjustable finger 31 carried by the arm 24. The finger 31 is adapted to engage with the side of the main body portion 7 of the fuel control valve when the float is permitted to move downwardly as the fuel level in the fuel chamber lowers and thereby restricts the extent of downward movement of the float, as shown in FIG. 2. The float 23 is of the usual conventional hollow type.

It will be noted by reference to FIG. 1 wherein the valve is shown in closed position and to FIG. 2 wherein the valve is shown in open position that there is a relatively small extent of movement of the float required to bring about this open position, particularly in view of the fact that FIG. 2 is a considerably enlarged view as compared with FIG. 1.

It is further noted that when the float moves about the pivot 26, the adjustable contact moves in an arc as represented by the arrow 33 and that the pressure on the ball 18 in response to the raising of the float 23 is, therefore, not along the longitudinal axes of the openings 12 and 15. With prior art needle type valves which have been previously described, this lack of straight line movement of the adjustable contact 27 would cause such prior art valves to tilt and in many instances fail to close the tapered ends thereof in sealed contact with the prior art type of contact seats. This was due primarily to the fact that the angling of the tapered end produced an elliptical contact with a circular seat.

With the present construction, however, failure of the ball valve 17 to have a positive seating and sealing action with the contact seat is overcome by the tendency of the ball 18 to roll in response to the accurate movement of the adjustable contact 27 simultaneously to its upward movement thereby causing more of a straight line pressure to be imparted upon the ball valve 17. The intermediate ball 18 further, by reason of the fact that it has a relatively point contact both with the adjustable contact 27 and ball valve 17, offers little or no frictional resistance and thereby insures instantaneous and positive function of said ball valve. This arrangement has overcome one of the major problems encountered with the prior art needle type valves. Also, by reason of the rolling action of the intermediate ball 18, in turn, does not make the same contact with the adjustable contact 27 and with the ball valve 17 thereby further insuring less wear and longer function.

The valve including its main body portion and sealed-in intermediate ball 18 and ball valve 17 by the displacing of the lower free edge 20 inwardly enables the entire valve unit to be initially assembled with the various parts thereof in precontrolled functional relation with each other and further enables the entire valve to be removed or replaced as required without danger of injury or altering of any of the working parts thereof.

As stated above the related proportions of the ball valve 17, intermediate pressure ball 18 and fuel passageway 15 are dimensionally controlled in accordance with the fuel line pressure and the horsepower of the motor with which the carburetor is to be used so as to insure that the proper amount of fuel will be allowed to pass through the valve at all times.

It is to be understood, however, that with motors of greater horsepower and with fuel lines of greater pressure, the related proportions of said respective parts will be altered accordingly. However, each will be retained in the same related proportions even though they might be overall dimensionally changed.

It has been found that if the diameter of the ball valve 17 with respect to the restricted passageway 15 is not carefully controlled, the desired floating spinning action of the ball valve 17 will not be attained so that the control of the related proportions thereof, as previously set forth, are of extreme importance, it being understood, of course, that they might be altered slightly with no appreciable detrimental effect.

The entire valve and float assembly carried by the cover plate 10 is properly supported within the fuel chamber when the cover member 10 is in secured relation with said fuel chamber 22. This is accomplished by the use of suitable bolts or the like 34 which are adapted to be threaded into the threaded bores 35 formed in the upper sides of the fuel chamber 22.

In FIGS. 4 and 5 there is shown a slight modification of the invention wherein the valve 36 is identical in construction with the above described valve with the exception of having a triangular shaped magnet 37 placed within the fuel passageway 12'. The magnet is in the form of a bar-like member having a triangular cross-sectional shape such as to provide fuel passageways 38 between said magnet and the inner walls of the passageway 12'. The end 39 of the magnet is located at a predetermined spaced relation with the steel ball valve 17' say, from 1/32 to 3/8 of an inch away from the ball, so as not to exert too strong a magnetic force thereon but is such as to aid in insuring that the ball 17' properly seats within the tapered valve seat 16' when moved toward said valve seat by pressure exerted upon the intermediate ball 18' in response to the rise of the float as previously described. The force of the magnet 37, therefore, is so controlled as to insure that the ball valve 17' will be forced away from the valve seat 16' by the pressure of the fuel in the fuel line so as to permit free flow of the fuel about said ball 17' when pressure is released upon the intermediate ball 18'. The valve otherwise functions identically the same as the previously described valve.

It is further pointed out that in connection with both of the valve constructions the dimension of the ball valve 17 or 17' is so controlled relative to the valve seat 16 or 16' and the size and extent of movement of the backing ball 18 or 18' is also so controlled that in no instance is the ball valve permitted to become dislodged from within the tapered valve seat 16 or 16'.

With the present valve arrangement liquid fuel is fed through the valve from the fuel line substantially immediately in response to the consumption of the fuel from the fuel chamber and, therefore, not only keeps pace with the consumption of the fuel at varying speeds of operation but also positively insures against flooding of the carburetor. The present valve construction, therefore, not only is extremely sensitive and positive in its action but also has been found to be much more durable than any known prior art valve construction.

The fact that the valve can be assembled and disassembled from the carburetor by the use of a wrench as results from the hexhead construction thereof as contrasted with most prior art valves which have a slot in the lower end thereof and which require the use of a screwdriver to remove and replace the valve, no working parts of the present valve are susceptible to injury such as often happened with the above-mentioned prior art constructions.

The ball valve 17 or 17' and the intermediate ball 18 or 18' are preferably formed of stainless steel but may be made of Monel, brass or of a plastic material such as Teflon or the like if desired, or may be of glass or ceramic material.

It has also been found that with the valve of the present construction the float level can be set lower because of more positive lever control and further because it maintains a more positive level of gas in the carburetor at all times under varying speeds and operating conditions. This arrangement has further been found to result in greater gas economy while also permitting much smoother operation of the engine under all conditions of use. This is contrary to the results which have been possible to attain with prior art needle type valves for such valves required greater movement of the float for high speed operation and resulted in the slow speed settings as always being too high in order to compensate for proper high speed operation. This was due to the fact that the float setting with prior art type needle valves had to be compromised to get more uniform operation at high speeds in order to get acceptable operation at idling speeds. With most prior art needle valves it has been necessary in the past to increase the idle speed particularly with automatic transmissions and resulted in great gas consumption and often caused the car to creep.

With the present valve all of the above difficulties have been overcome for it permits smooth operation of the engine at all speeds and permits slower smooth idling with the result that there is no tendency for the car to creep and further with the result of much greater economy in gas consumption.

In FIG. 6 there is shown a modification of the valve embodying the invention and which has proven extremely efficient for use with all konwn carburetors of different makes of cars and which performs very efficiently and consistently under all conditions of driving. This valve, like the previously described valve, embodies a main body portion 41 having a relative large passageway 41' and a restricted cylindrically shaped passageway 42 therein of a controlled smaller diameter than the passageway 41'. The passageway 41' terminates in an annular concave curvature 63 of a radius of from approximately 1/16 to 1/8 of an inch blending into an annular convex curvature 64 of a radius of from approximately 1/16 to 1/8 of an inch whose inner edge is of substantially the same diameter as the adjacent end of the restricted passageway 42. This arrangement directs the flow of the fuel inwardly without turbulence such as would be caused by the rapid flow of fluid by a sharp corner. These radii compresses the fluid into a more solid mass and a more straight line flow is achieved. The increase in flow is approximately 5%. This increase is achived at the same pressure and same dimension of restricted passageway 42. This increase is confirmed with highly accurate instrumentation. This results in a more sensitive control of the opening and closing of the ball shaped face part or ball valve 47 and the spinning of the ball 47 is more positively controlled and more sensitive in its action. The passageway 42 in this instance communicates with a relatively narrow curved annular valve seat 43 which, in turn, communicates with a hollow tapered section 44. The hollow tapered section 44, in turn, communicates with a cylindrically shaped recessed area 45 having side walls which are parallel with the longitudinal axis 46 of the valve. A small ball valve 47 of a given preselected size is adapted to engage the relatively narrow curved annular valve seat 43 and is adapted to have substantially line contact with the circular edge 48, which edge is the line of intersection between said annular valve seat and the passageway 42. The small ball valve is adapted to be engaged by a large ball 49 located within the cylindrically recessed area 45 and which functions as actuating means. The large ball 49 is loosely retained in said recessed area by an inturned lip 50 which surrounds the open end 51 of said cylindrically recessed area.

The essence of the invention, in this particular construction, is that the passageway 42, relatively narrow annular curved seat 43, the hollow tapered section 44 and the cylindrically recessed area 45 are all carefully controlled as to their related dimensions, in accordance with the preselected diameter of the small ball valve 47, and are also controlled so as to be in proper aligned relation with each other along the longitudinal axis 46 of the valve when the small ball valve 47 is in engagement with its seat.

While the small ball valve may be of different sizes, in accordance with difference of fuel line pressures, it has been found, in order to produce maximum efficiency with various different types of carburetors, that the passageway 42 be circular and of a diameter of from 80% to 85% that of the diameter of the small ball valve.

In other words, if the small ball, as given in the following example, is of stainless steel of about .09 gram in weight and of a diameter of about 7/64 of an inch (.1093 of an inch) the diameter of the passageway 42 will be of from about .085 to .093 of an inch. The relatively narrow curved valve seat, in this instance, is controlled to be of from about .004 to .006 of an inch larger in curvature than small ball valve 47 or approximately 4% larger in curvature than said small ball valve. The curved valve seat 43 is of from about .015 to .030 of an inch in width.

The preferred angle of the hollow tapered section 44 with the above dimensions, and with the dimensions of the large ball or actuating means 49 and recessed area to be given hereinafter, is approximately 41° with respect to the longitudinal axis 46 of the valve and intersects and therefore communicates with the curved seat 43 in such manner as to provide a mouth portion 52 leading into said annular curved valve seat of a diameter of approximately 104% larger than the diameter of the small ball valve or approximately .114 of an inch in width. This causes the small ball valve member to have line contact with the intersecting edge 53 of said curved annular valve seat with the passageway 42 and provides a clearance on each side of said small ball valve member 47 to reduce molecular attraction.

The large ball or actuating member 49 in the present example is of stainless steel of about 1.45 gram in weight and of a diameter ranging from approximately 250% to 300% that of the small ball valve 47 or, in the present instance, is preferably 9/32 of an inch in diameter. The cylindrically recessed area 45 is of a diameter of from about .0109 to .013 of an inch larger than the diameter of the large ball or actuating member to permit free and loose movement thereof. The open end 51 of the cylindrically recessed area within the area of the inturned lip 50 which loosely retains the large ball member 49 in said recess is of a diameter such as to permit the large ball member, when in engagement with the inner edge of said inturned lip, to protrude outwardly thereof of from about .085 to .110 of an inch. The length of said cylindrically recessed area from said inturned edge to the point of intersection 54 thereof with said tapered wall 44 is such that when the large ball 49 is engaged and raised by the contact 27 of the float lever 24 in response to the rise of fuel in the fuel chamber and is caused to move the small ball valve member 47 into intimate closed line contact with the curved valve seat 43, the large ball member will still protrude outwardly of said open end 51 by an amount of from about .045 to .055 of an inch. The range of movement of the large ball member is such as to prevent the small ball valve 47 from being displaced from within said tapered hollow section 44 when forced away from the valve seat 43 by the pressure of the fuel line as shown by the dash lines 55 in FIG. 6. The related size of the small ball valve 47 and passageway 42 is such as to expose an area of said small valve which is controlled according to the pressure of the fuel line so as to ensure positive displacement of the small ball valve from the valve seat when the float lowers in the fuel chamber 22. The above-mentioned related sizes are so controlled as to cause the small ball valve to spin in response to the flow of liquid fuel about said valve and provides a self-cleansing function.

It is pointed out that all of the above-mentioned inner surfaces of the valve member are carefully finished or burnished to insure that there are no protrusions thereon.

It is further to be understand that the related proportions of the parts of the valve defined above are designed for use with a fuel pump pressure of from 4 to 6 lbs. per square inch and the same proportions are retained with any of the fuel line pressures of different automotive vehicles with the exception that they are increased in related sizes in accordance with the increase of fuel pressure. However, as stated above, the valves will, in all instances, have their various parts formed in the same related proportions. The related dimensions therefore of the small ball valve 47 and the passageway 42, together with the curved valve seat 43, is very important, as one size controls the related size of the other of said parts. As the passageway increases in size in accordance with the larger size of the small ball valve required for a particular carburetor, more area of the small ball valve is exposed to the pressure of the fuel line. This requires more float pressure to keep the small valve closed against the fuel line pressure. Thus, the related proportions of the small ball valve and passageway must be controlled in accordance with the float pressure to produce the desired opening and closing action of the small ball valve and must be such as to give instantaneous response in accordance with the level of fuel in the fuel chamber. It has been found that the above related dimensions, therefore, are extremely critical.

The diameter A of the passageway 42 in this instance is from .090 to .091 of an inch or 17% to 18% smaller than the diameter of the small ball valve which is given in the example set forth above as being 7/64 of an inch in diameter. This is to allow the small ball to enter and extend into the passageway at the end thereof which communicates with the curved valve seat.

It has also been found that the taper of the hollow section 44 is also critical and while stated above as being preferably of an angle of 41° it must be such as to allow the small ball valve to be dislodged from the valve seat and to spin in response to the flow of fuel when the valve is open. As the angle is decreased, the small ball valve will spin at too rapid a speed and will be hindered in its closing effect in response to the rise of the float. On the other hand, if its angle is too large it will permit the small ball valve 47 to go out too far during its spinning action and stick between the large ball and the angle of the hollow section 44.

The above related dimensions therefore are carefully retained so as to permit the small ball valve to be dislodged from the valve seat by the fuel pressure when the float lowers in the fuel chamber and to spin and have a so-called self-cleansing action and to constantly insure that the small ball valve will quickly and positively respond to the rise of the float in the fuel chamber against the pressure of the fuel line. This is to permit the small ball valve to be held in closed position until the fuel again lowers in the fuel chamber. The opening and closing of the small ball valve is such as to instantaneously keep pace with the change of fuel level in the chamber.

It has been found from experience that a valve having its various correlated parts controlled in accordance with the above related dimensions and percentages, produces an extremely simple, durable and efficient valve.

The lip 50 is tapered outwardly to a relatively thin sharp edge and is struck inwardly a controlled amount by a tool 57, fragmentarily illustrated in FIG. 6. The tool has a controlled taper 58 and an end 59 adapted to engage a stop surface 60 formed on the adjacent end of the main body portion of the valve. This is to insure a standard inward deflection of said tapered lip 50. This control of the inward deflection of the lip 50 is important in that it must be such that the large ball valve will not stick within the open end 51 and care is exercised that the inner surface of said lip 50 has no puckering or flaking. The opening end 51 is preferably of from 6 to 7 thousandths of an inch smaller than the diameter of the large ball member 49 when the lip 50 is struck inwardly the predetermined amount set forth above. It is to be understood that the dimension of the lip and the taper 58 is so controlled as to bring about this result.

In order to permit the fuel to flow outwardly of the valve, the side walls of the cylindrically recessed area 45 have four perforations 61 therein which may or may not be diametrically opposed.

With the above arrangement there is no tendency of the small ball valve to tilt relative to the seat when the carburetor is tilted by different inclinations of the vehicle as is the case with prior art needle valves and no leakage can, therefore, take place. The large ball member is free to rotate and in no way hinders the function of the small ball valve. The fact that both balls rotate and present different locations of engagement with each other and of the small ball valve with the valve seat life and durability of the valve in general is greatly increased.

A further feature of the invention is the controlling of the size of the perforations 61 so that each of their areas B are approximately the same as the cross sectional area A of the cylindrical passageway 42. The location of the lower edges of the perforations are controlled so as to be a distance C from the horizontal center line of the small ball valve, when it is in engagement with its valve seat 43, substantially equal to the cross sectional area A of said passageway.

The flow of fluid at maximum opening of the valve 47 is increased by retaining the above relationship between the passageway 42 and the total areas of the perforations 61. Experiment has shown that too large a size of perforations causes an undesirable turbulence in the area of the small ball valve and the passageway and results from the spinning of the ball which cause an increase in flow of the liquid fuel. Therefore, if the size of perforations are kept in proper relationship to passageway the area as given above turbulence is prevented and an increase flow of liquid fuel into the fuel chamber is attained. This increase in flow is of great importance as it gives instant high volume. It gives excellent control because the passageway can be kept smaller than is conventional for the needle and seat type of valve. In high performance cars with large cubic inch engines increase in pickup and top speed and good idle speed are easily obtained. High fuel pump pressure is controlled perfectly with the above relationship of passageway and perforations. The smaller passageway makes high fuel pump pressure easy to control, loading, flooding and hesitation are eliminated. The related proportions of the small ball valve and the passageway which have given ideal results is as follows:

Small ball valve _____ .093
Passageway _____ .084
Small ball valve _____ .200
Passageway _____ .180

When the passageway is too large the small ball valve tends to stick into the passageway and won't release as the float comes away from the large ball or actuating member. When this occurs we must go the other way, that is, decrease the size of the passageway a few percentage points until the closing of the ball valve requires a minimum of pressure from the float or the closing means and a minimum of pressure from the pump or other means to open the ball valve. When we achieve this maximum operating efficiency we have a very low differential. The differential is the difference between the float pressure required to close and the fuel pressure required to open the valve. This gives a perfect reliability factor for the opening and closing of the small valve ball.

In FIGS. 7 and 8 there is shown a further modification of the invention wherein the orifice 65 and restricted passageway 66 in the housing 67 are joined with each other by the annular concave and annular convex portions 68 and 69 respectively having a radius of curvature of from 1/16 to 1/8 of an inch whose function is the same as defined in connection with the annular portions 63 and 64 of FIG. 6.

The remaining structure and function of the valve is the same as defined in connection with the valve of FIG. 6 with the exception that the part containing the orifice 65, restricted passageway 66, curved valve seat 71 and tapered section 72 is formed separately of the outer cylindrical part 73 which forms the housing 67. They are thereafter joined together along the contiguous surfaces 74 thereof by a press fit or other means.

The open end of the housing is further provided with a cap 75 having an opening 76 therein. The cap is threadedly connected with the housing 67 as shown at 77.

An additional feature is the provision of a projection or rod-like part 78 which is press fitted in an opening in the large backing ball or actuating member 79 whose dimension and function is like the large ball 49 of the structure shown in FIG. 6. The difference being that the rod-like part extends outwardly of the opening 76 in the cap and is adapted to be engaged by the float lever 80 as shown in FIG. 8. This arrangement is required when the valve is surrounded by a cage 81, as diagrammatically shown in FIG. 8, which prevents the float lever 80 from being placed in direct engagement with the large ball or actuating member 79 as shown in FIGS. 1 and 2.

The cage 81, in this instance, is formed of wovenscreen like material which surrounds the valve housing 67 and is attached at one end to the cover 10' by screws or the like 82, and has an opening 83 in the opposite end portion 84 thereof through which the rod-like part 78 extends. The cage is for the purpose of filtering the liquid fuel and also to reduce turbulence of the fuel in the fuel chamber which might be caused by the liquid fuel squirting out of the openings 85 in the side walls of the cylindrical housing 67. The openings 85 have substantially the same function and area B' as the passageway A' and the same location C' as defined in connection with similar parts A, B and C of FIG. 6.

The length of the rod-like member 78 is controlled in accordance with the requirements of a particular installation and has a ball shaped end face 86 which engages the lever 80.

The large ball or actuating member 79 is provided with angularly disposed spaced grooves 87 throughout the circumference thereof which are adapted to cause it to rotate in response to the flow of the liquid fuel as it is forced under pressure through the passageway 66 when the small ball valve 88 is open.

In FIG. 9 there is shown a further modification wherein all the parts 89, 90, 91, 92, 93, 94, 95, A", B" and C" are dimensionally the same and have the same correlation and function as similar parts of the previously defined valves of FIGS. 6 and 7 with the exception of the actuating member 96. In this instance the actuating member 96 has an intermediate cylindrically shaped part 97, an integral ball shaped face part 98 for engaging the small ball valve 93 and an integral reduced projection 98'. The reduced projection has a ball shaped end surface 99 for engaging the lever of the float and is controlled in length in accordance with the installation requirements as defined above for the projection or rod-like part 78 of FIG. 7.

The intermediate cylindrically shaped part 97 has a shoulder portion 100 for engaging the inturned lip 101 and is controlled in length so as to prevent the small ball valve 93 from being displaced from within the tapered section 95 as has been previously described.

The ball shaped face part is provided with spaced angularly disposed grooves which function in the same manner as the grooves defined in the structure of FIG. 7.

In FIGS. 10a and 11a there is shown a further modification which has the same correlated parts and function as the valves of FIGS. 6, 7 and 9 with the exception that the part having the ball shaped face 103 is formed integral with the actuating member 104.

The reduced projection or rod-like part 105, in this instance, is provided with a circumferential groove 106 in which the recessed bifurcated end 107 of a plate like part 108 is snapped as shown in FIG. 11a so as to permit the actuating member 104 to rotate. As described in the structures of FIGS. 7 and 9 the actuating member is provided with space angularly disposed grooves 109 to bring about said rotation.

The plate like part 108 is pivotally connected as indicated at 109' to a link 110 which in turn is pivotally connected at 111 to a plate 112 which is riveted or otherwise attached to the lever 113 of the float. This causes the float to have the dual function of positively opening and closing the valve.

The rotation of the actuating member 104 and ball shaped face part 103 introduces the self cleansing function of said face part and its curved valve seat 113 in a manner similar to the previously described valves.

From the foregoing description it will be seen that simple, efficient, and economical fuel control valve means have been provided for use with carburetors for internal combustion engines which are not only sensitive and positive in their function but which are also much more durable and efficient and by means of which much less gas consumption is attained.

While applicant has shown and described his preferred constructions of valves and use thereof, it is to be understood that many changes may be made in the details of construction and different uses and positions of use thereof may also be made without departing from the spirit of the invention as expressed in the accompanying claims as the preferred valves and use thereof only have been shown and described by way of illustration.

Having described my invention I claim:

1. A liquid flow control valve member for use with a device of the character described embodying a liquid line and engagement means for engaging and operating said liquid flow control valve member, said valve member comprising a main body portion having a restricted liquid passageway therein, means on the end of said body portion adjacent said passageway for coupling said passageway to said liquid line, said body portion having a hollow tapered section internally thereof of a controlled length and of a given taper and having a valve seat adjacent its narrowest end and in communicating relation with said passageway, said valve member embodying a ball shaped face part of a diameter slightly larger than the diameter of the restricted passageway and controlled in accordance with the taper of said hollow tapered section such as to have the major portion thereof lying within said tapered section and to have line contact with said seat when in engaging relation therewith, said body portion having an enlarged cylindrically shaped open area therein communicating with the hollow tapered section and having an inwardly extending end part opposite said tapered section and an open end whose major area is of a size smaller than the diameter of said cylindrically shaped open area, said cylindrically shaped open area having openings in the side walls thereof each of an area substantially equal to the cross sectional area of the passageway, said valve member further embodying an enlarged part functioning as actuating means internally of said cylindrically shaped open area and larger than the diameter of said ball shaped face part and having a part extending outwardly of said open end and adapted to be engaged by said engagement means, said actuating part being of a length such as to prevent said part having the ball shaped face part from being displaced from within said hollow tapered section when said actuating part moves in a direction away from said valve seat and engages said inwardly extending end part and sufficient in length to provide for unrestricted flow from said passageway by said ball shaped face part to said openings.

2. A liquid flow control valve member for use with devices embodying a liquid chamber, a liquid line for feeding liquid under pressure into said chamber and a float having engagement means for engaging and operating said liquid flow control valve member; said valve member comprising a main body portion of rigid material having a restricted liquid passageway therein, means on the adjacent end of said body portion for coupling said restricted passageway to said liquid line, said body portion having a hollow tapered section internally thereof of a controlled length and of a given taper and having a valve seat adjacent its narrowest end and in communicating relation with said passageway, said valve member embodying a part having a ball shaped face of a diameter slightly larger than the diameter of the restricted passageway and controlled in accordance with the taper of said hollow tapered section such as to have the major portion thereof lying within said tapered section and to have line contact with said seat when in engaging relation therewith, said body portion having an enlarged cylindrically shaped open area therein communicating with the hollow tapered section and having an inwardly extending end part opposite said tapered section and an open end of a size smaller than the diameter of said cylindrically shaped open area, said cylindrically shaped open area having openings in the side walls thereof controlled to be each of an area substantially equal to the cross sectional area of the passageway, said valve member further embodying an enlarged part functioning as actuating means internally of said cylindrically shaped open area and of a width slightly narrower than the width of said open area and larger in width than the diameter of said ball shaped face part and having a portion which may be of a varied length in accordance with particular installation requirements extending outwardly of the open end of said body portion by an amount sufficient to be engaged by the engagement means of the float to move said enlarged actuating part internally of said cylindrically shaped open area and to, in turn, move the ball shaped face part into engagement with the valve seat in response to the movement of said engagement means as the float rises with the rise of liquid in the chamber.

3. A device as set forth in claim 2 further characterized in that the part having the ball shaped face part is in the form of a separate small ball valve.

4. A device as set forth in claim 2 further characterized in that the part having the ball shaped face part is in integral relation with the actuating means.

5. A device as set forth in claim 2 further characterized in that the actuating means is in the form of a cylindrical member having a ball shaped face portion for engaging a small ball valve, which face has spaced angularly disposed grooves therein.

6. A device as set forth in claim 2 further characterized in that the location of the openings in the side walls of the cylindrically shaped open area are so controlled as to have their edges disposed toward the ball shaped face part of the valve located a distance from the horizontal center line of the ball shaped face part when it is in contact with the valve seat substantially equal to the diametrical size of the passageway which communicates with the cylindrically shaped open area through said valve seat.

References Cited by the Examiner
UNITED STATES PATENTS

| | | | |
|---|---|---|---|
| 1,783,273 | 12/1930 | Beach | 261—70 X |
| 2,061,480 | 11/1936 | Pigott | 251—124 |
| 2,646,073 | 7/1953 | Schor | 251—339 X |
| 2,748,798 | 6/1956 | Withrow | 137—533.17 |
| 3,013,576 | 12/1961 | Read | 137—449 X |
| 3,180,354 | 4/1965 | Grose | 137—436 |

WILLIAM F. O'DEA, *Primary Examiner.*

MARTIN P. SCHWADRON, ISADOR WEIL,
*Examiners.*

D. MATTHEWS, *Assistant Examiner.*